UNITED STATES PATENT OFFICE.

FRITZ E. STOCKELBACH, OF DETROIT, MICHIGAN, ASSIGNOR TO FREDERICK STEARNS & COMPANY, OF DETROIT, MICHIGAN, A CORPORATION OF MICHIGAN.

PROCESS OF MANUFACTURING DIACETYL-PARAMIDO-PHENOL.

1,034,528.  Specification of Letters Patent.  Patented Aug. 6, 1912.

No Drawing.  Application filed April 9, 1912. Serial No. 689,597.

*To all whom it may concern:*

Be it known that I, FRITZ E. STOCKELBACH, a subject of the King of Denmark, residing at Detroit, in the county of Wayne and State of Michigan, have invented certain new and useful Improvements in Processes of Manufacturing Diacetyl-Paramido-Phenol, of which the following is a specification.

The invention relates to the manufacture of compounds from paramido-phenol and acetyl bodies, and the invention consists in the novel method as hereinafter set forth.

Heretofore it has been known that if paramido-phenol is heated with acetic anhydrid and then distilled until the anhydrid is driven off, the result is that nearly the whole mass carbonizes. If however, the heating is continued only until the temperature reaches 160° C. and the remainder crystallized several times from water, white crystals are obtained of the composition

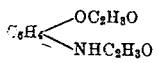

and which have a melting point of 150° C.

With the above described process the yield of product is so small that the process has no commercial value. With the improved process which forms the subject matter of this invention, the same product may be obtained by the use of less costly materials and with a greatly increased yield as follows: Molecular weights of paramido-phenol and an acetyl body, preferably acetyl chlorid are mixed and heated preferably in a flask furnished with a reflux condenser from four to six hours or until hydrochloric acid gas ceases to be given off. The heating is then continued without the condenser until the whole mass is melted, after which the melted substance is poured into an equal amount of hot water and stirred briskly. As a result a dark granulated product is obtained which crystallized from water upon the addition of charcoal, gives white crystals melting at 150° and having the composition as above set forth.

An increase in the yield is obtained by using a condensing agent, such for instance as a small amount of zinc dust. Other acetyl bodies may also be substituted for the acetyl chlorid, as for instance by the use of glacial acetic acid, zinc chlorid being used as a condensing agent in this instance. However, I prefer the process as above described.

The product has valuable medicinal properties, and particularly as an antipyretic, anti-neuralgic and sedative remedy.

What I claim as my invention is:

1. The process of obtaining a compound from an amido-phenol and an acetyl body which consists in heating the said bodies in the presence of a condensing agent and in subsequently separating the product by crystallization.

2. The process of obtaining a compound from an amido-phenol and an acetyl body which consists in heating a mixture of the amido-phenol and acetyl chlorid.

3. The process of obtaining a compound from paramido-phenol and an acetyl body which consists in heating a mixture of the paramido-phenol and acetyl chlorid until the hydrochloric acid gas is driven off, in continuing the heat until the material is melted, in pouring the melted substance into hot water and agitating to obtain a granular product and in subsequently purifying the product by crystallization.

4. The process of obtaining a compound from a paramido-phenol and an acetyl body, which consists in heating a mixture of paramido-phenol and acetyl chlorid with zinc dust as a condensing agent.

In testimony whereof I affix my signature in presence of two witnesses.

FRITZ E. STOCKELBACH.

Witnesses:
JAMES P. BARRY,
MARION B. FAY.

Copies of this patent may be obtained for five cents each, by addressing the "Commissioner of Patents, Washington, D. C."